US009629181B1

(12) United States Patent
Hart

(10) Patent No.: US 9,629,181 B1
(45) Date of Patent: Apr. 18, 2017

(54) LINK AWARE CLEAR CHANNEL ASSESSMENT

(71) Applicant: Cisco Technology, Inc., San Jose, CA (US)

(72) Inventor: Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 96 days.

(21) Appl. No.: 14/656,760

(22) Filed: Mar. 13, 2015

Related U.S. Application Data

(60) Provisional application No. 62/056,732, filed on Sep. 29, 2014.

(51) Int. Cl.
H04L 12/28 (2006.01)
H04W 74/04 (2009.01)

(52) U.S. Cl.
CPC .................................. H04W 74/04 (2013.01)

(58) Field of Classification Search
CPC ..... H04W 74/04; H04W 52/12; H04W 52/06; H04W 52/16
See application file for complete search history.

(56) References Cited

U.S. PATENT DOCUMENTS

| 6,256,510 B1 * | 7/2001 | Muraoka | H04W 52/346 455/522 |
| 7,688,762 B2 * | 3/2010 | Douglas | H04L 45/00 370/255 |
| 7,720,440 B2 * | 5/2010 | Zhu | H04W 48/10 370/328 |
| 7,801,546 B2 | 9/2010 | Yang et al. | |
| 8,565,805 B1 * | 10/2013 | Vargantwar | H04W 52/265 455/115.1 |
| 2001/0019549 A1 * | 9/2001 | Kim | H04W 52/146 370/338 |
| 2006/0046739 A1 | 3/2006 | Blosco et al. | |
| 2006/0109787 A1 | 5/2006 | Strutt et al. | |
| 2007/0060155 A1 | 3/2007 | Kahana et al. | |
| 2012/0320759 A1 * | 12/2012 | Shao | H04W 24/02 370/242 |

(Continued)

OTHER PUBLICATIONS

Tytgat et al., "Avoiding collisions between IEEE 802.11 and IEEE 802.15.4 through coexistence aware clear channel assessment", EURASIP Journal on Wireless Communications and Networking, Apr. 10, 2012, 15 Pages.

*Primary Examiner* — Robert Wilson
(74) *Attorney, Agent, or Firm* — Edell, Shapiro & Finnan, LLC

(57) ABSTRACT

A pair of Clear Channel Assessment (CCA) rules are presented that protect an initiator's transmission at the responder, and the responder's transmission at the initiator, using additional fields transmitted in a preamble (header) of a Physical Layer Convergence Procedure (PLCP) Protocol Data Unit (PPDU) or in a Media Access Control (MAC) header, if unencrypted and robustly modulated. These techniques enable more parallel/simultaneous transmissions between devices that might otherwise interfere with each other, subject to ensuring an adequate Signal-to-Interference and-Noise Ratio (SINR) for the initiator's transmission at the responder and ensuring an adequate SINR for the responder's transmission at the initiator.

23 Claims, 9 Drawing Sheets

(56) References Cited

U.S. PATENT DOCUMENTS

2013/0124883 A1* 5/2013 Addepalli .............. G06F 1/28
 713/310
2015/0098378 A1* 4/2015 Dore .................. H04W 24/02
 370/311

* cited by examiner

LINK AWARE CLEAR CHANNEL ASSESSMENT

CROSS-REFERENCE TO RELATED APPLICATION

This application claims priority to U.S. Provisional Application No. 62/056,732, filed Sep. 29, 2014, the entirety of which is incorporated herein by reference.

TECHNICAL FIELD

The present disclosure relates to wireless networks.

BACKGROUND

Clear Channel Assessment (CCA) is a technique by which devices detect energy on a channel before initiating a transmission, so as to avoid or minimize interference with other transmissions that may be occurring in the channel. For example, there are CCA rules defined in the IEEE 802.11 wireless local area network (WLAN) standard.

DESCRIPTION OF EXAMPLE EMBODIMENTS

Overview

A pair of Clear Channel Assessment (CCA) rules are presented that protect an initiator's transmission at the responder, and the responder's transmission at the initiator, using additional fields transmitted in a preamble (header) of a Physical Layer Convergence Procedure (PLCP) Protocol Data Unit (PPDU) or in a Media Access Control (MAC) header, if unencrypted and robustly modulated. These techniques enable more parallel/simultaneous transmissions between devices that might otherwise interfere with each other, subject to ensuring an adequate Signal-to-Interference and-Noise Ratio (SINR) (e.g., 15-30 dB) for the initiator's transmission at the responder and ensuring an adequate SINR (e.g., 10-30 dB) for the responder's transmission at the initiator.

Detailed Description

Figure 1:
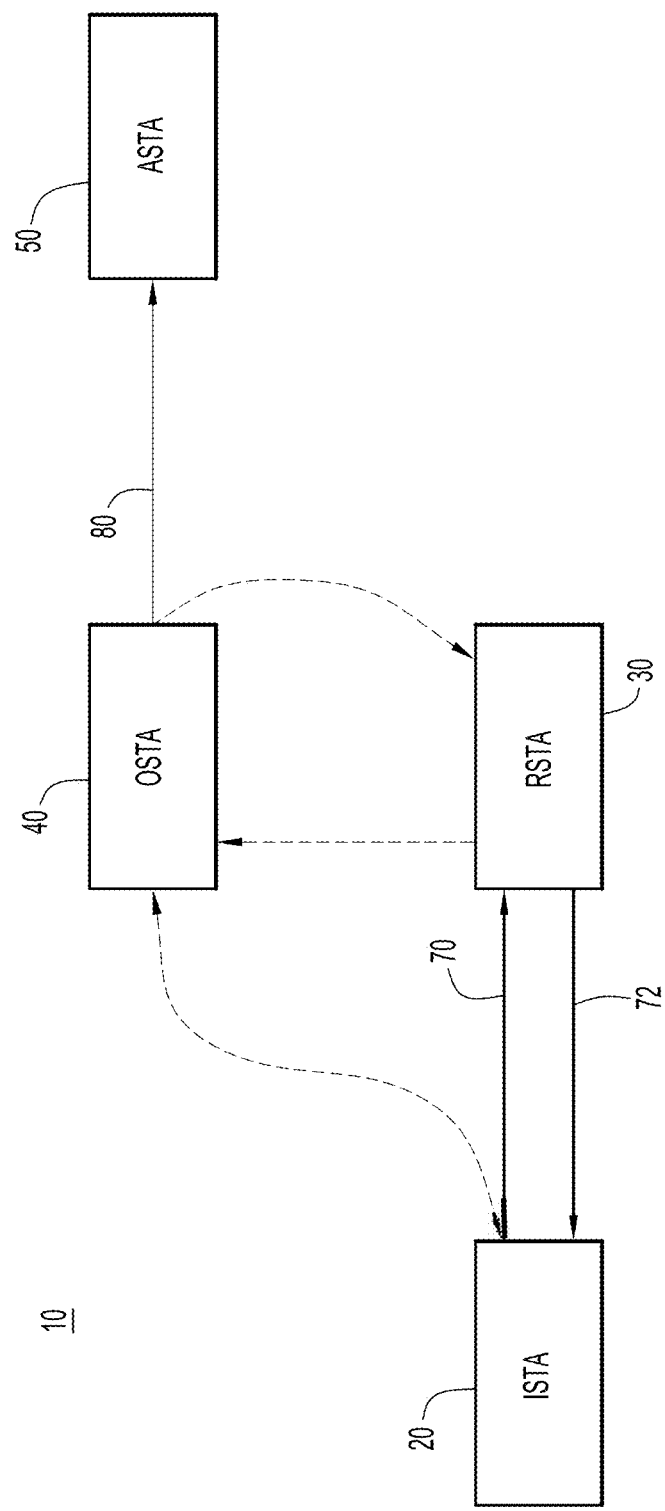
FIG. 1 is a system block diagram showing devices of a wireless network in which the Clear Channel Assessment (CCA) techniques presented herein may be employed, according to an example embodiment.

Reference is first made to FIG. 1. FIG. 1 shows a block diagram of a wireless network environment 10, such as an IEEE 802.11 WLAN. In this diagram, the blocks or boxes represent wireless communication devices or devices with wireless communication capabilities. More specifically, initiating stations (STAs) (called "ISTAs") transmit data units (e.g., PPDUs) that contain unicast frames desired by a responder STA (called "RSTA"). Other overlapped STAs (called "OSTAs") may want to transmit data units (e.g., PLCP protocol data unit (PPDUs)) at the same time as the desired PPDUs (e.g., to the "any STA" (referred to as ASTA), or to the RSTA shown in FIG. 1). ISTAs and OSTAs are not disjoint sets since, for example, if the RSTA is an access point (AP), then its clients are both ISTAs and potential OSTAs.

FIG. 1 illustrates a scenario with ISTA 20, RSTA 30, OSTA 40 and ASTA 50.

A goal of the techniques presented herein is to protect both an initiating PPDU 70 sent by ISTA 20 and a response PPDU 72 sent by RSTA 30, but allow parallel/simultaneous transmissions by other devices, e.g., transmission 80 by OSTA 40, which are not going to interfere with the exchange between the ISTA 20 and RSTA 30. Transmissions by the ISTA 20, RSTA 30 or OSTA 40 can induce interference on other STAs, as indicated by the dashed lines shown in FIG. 1.

Existing CCA rules can lead to unnecessarily higher signal-to-interference-plus-noise ratio (SINR) at the receiver (when the two devices are very close together), or inadequate protection at the receiver (when the two devices are very far away). Conversely, existing CCA rules may prevent parallel/simultaneous transmissions that could both succeed.

Initiating Transmission

Figure 2:
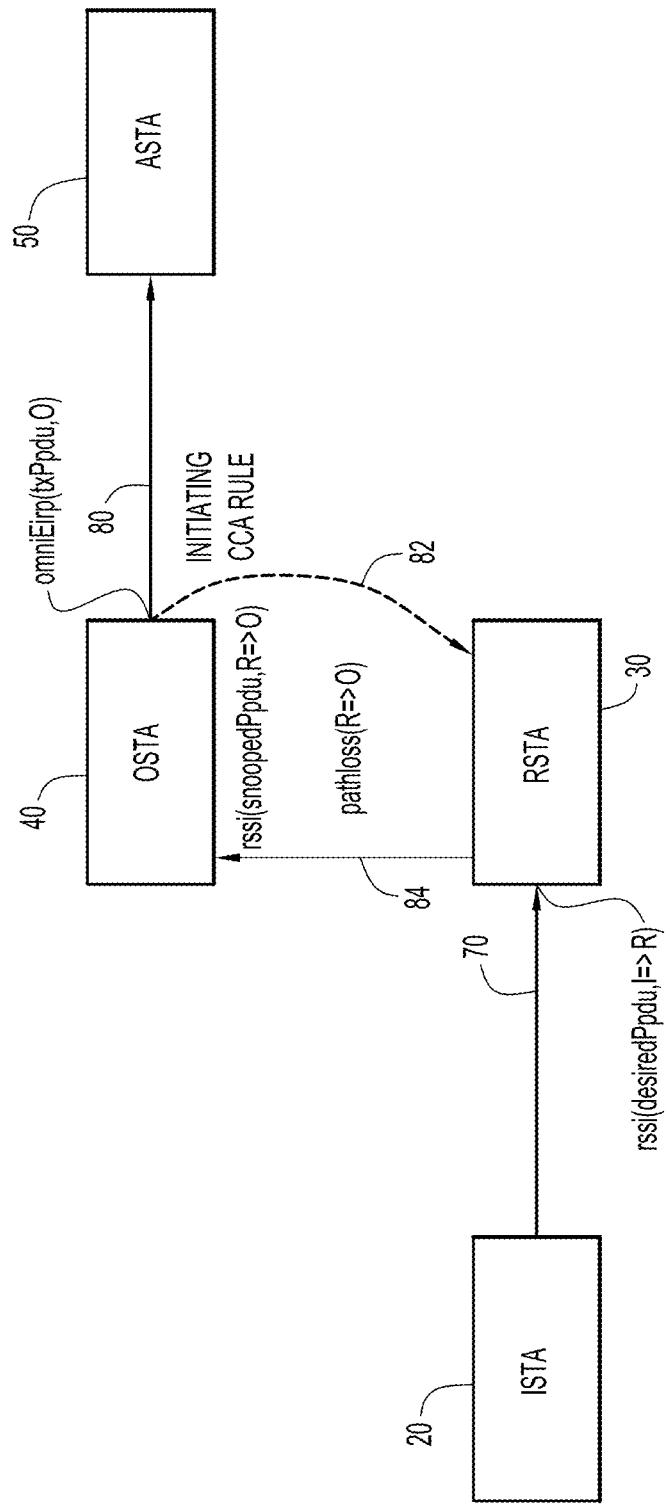
FIGS. 2 and 3 illustrate the wireless network of FIG. 1, in the case of a transmission from an initiating device, according to an example embodiment.
Figure 3:
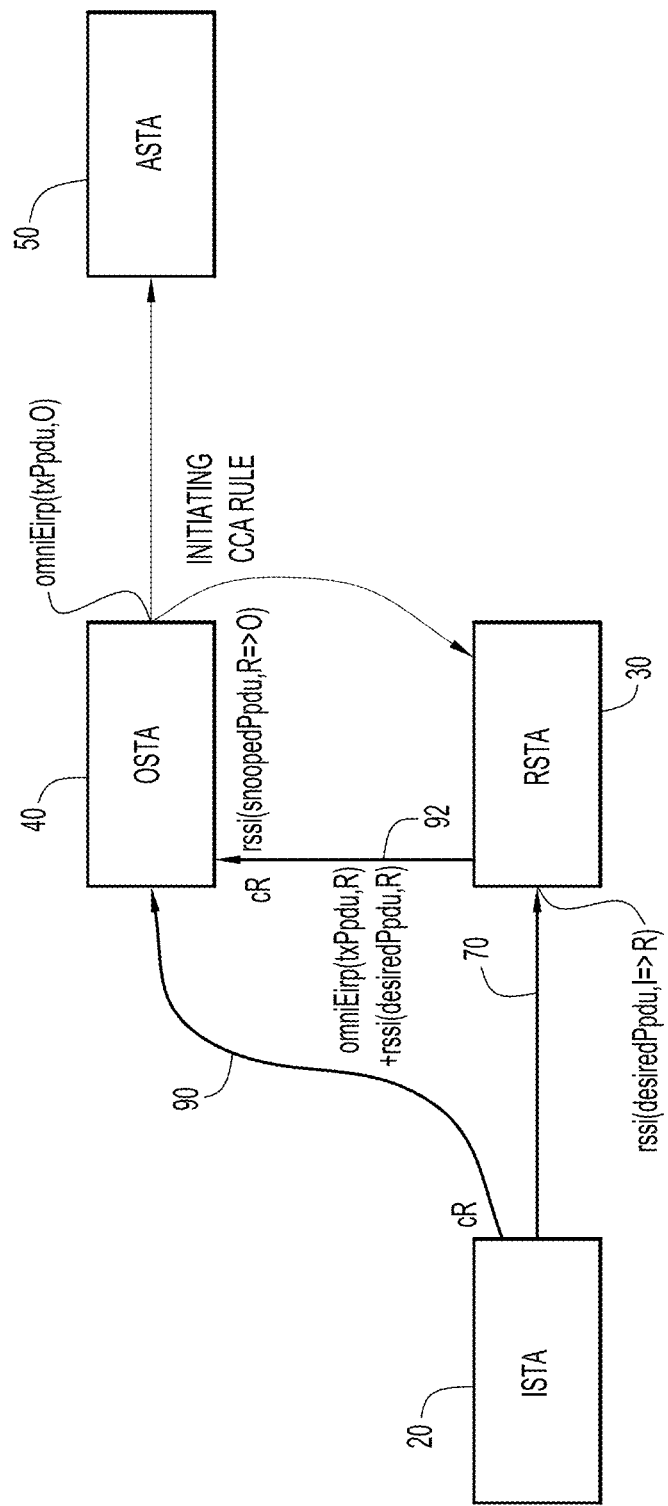

Reference is made to FIGS. 2 and 3 for a description of a new Clear Channel Assessment (CCA) rule for an initiating PPDU. First in FIG. 2, the RSTA 30 can successfully receive PPDUs from ISTA 20 if either power from a colliding PPDU shown at reference numeral 82 associated with the PPDU 80 OSTA sends to ASTA 50 is received at the RSTA 30 at no greater than rssi(desiredPpdu,I $\Rightarrow$ R)–Margin, or the OSTA does not transmit. This requires the Initiating CCA rule:

$$\text{rssi(desiredPpdu,} I \Rightarrow R) - \text{Margin} > \text{omniEirp(txPpdu,} O) - \text{pathloss}(R \Rightarrow O)$$

$$\text{pathloss}(R \Rightarrow O) = \text{omniEirp(txPpdu,} R) - \text{rssi(snoopedPpdu,} R \Rightarrow O)$$

$$So: \text{rssi(desiredPpdu,} I \Rightarrow R) - \text{Margin} > \text{omniEirp(txPpdu,} O) - \text{omniEirp(txPpdu,} R) + \text{rssi(snoopedPpdu,} R \Rightarrow O)$$

where:

rssi(desiredPpdu,I$\Rightarrow$ R) is receive signal strength information at the RSTA 30 for the initiating transmission 70 sent by the ISTA 20. rssi(desiredPpdu,I$\Rightarrow$ R) could be a maximum/mean/X-percentile (e.g. X=95) over a recent window (e.g. 5 sec) of transmissions previously sent by the ISTA and received by the RSTA, and perhaps include higher weighting of more recent data (e.g. via an exponentially weighted filter).

omniEirp(txPpdu,O) is an expected power of the transmission by the OSTA. To be more precise, "omniEirp" is the expected Equivalent Isotropically Radiated Power (EIRP) from a transmission;

omniEirp(txPpdu,R) is an expected power of the initiating transmission 70 sent by the ISTA to the RSTA; and rssi(snoopedPpdu,R⇒O) is the RSSI received at the OSTA of a PPDU transmitted by the RSTA, as shown at reference numeral 84. The PPDU may or may not be intended for reception by the OSTA (i.e. it may be a snooped PPDU).

(Initiating CCA Rule):

$$Or: \text{omniEirp}(txPpdu,O) < \text{omniEirp}(txPpdu,R) + \text{rssi}(desiredPpdu,I \Rightarrow R) - \text{rssi}(snoopedPpdu,R \Rightarrow O) - \text{Margin} \qquad \text{Equation 1}$$

Margin may be an agreed and standardized value (e.g. in the range of 15-30 dB), or in another embodiment may be defined by an associated AP, or may be transmitted in a field by the RSTA 30 either as a distinct parameter or in combination with other parameters, such as omniEirp(txPpdu,R)+rssi(desiredPpdu,I⇒R)−Margin. It may further be adjustable by an overlapping device, e.g., OSTA 40 or ASTA 50.

Reference is now made to FIG. 3, with continued reference to FIG. 2. For the OSTA 40 to implement the Initiating CCA rule, it needs several pieces of information. omniEirp (txPpdu,O) is already known to the OSTA 40 because it knows the power at which it will send the transmission 80. The omniEirp(txPpdu,R) and rssi(snoopedPpdu,R⇒O) parameters need to come from the same PPDU (or the signaling of the omniEirp(txPpdu,R) parameter in one PPDU needs to indicate that the parameter also characterizes the omniEirp(txPpdu,R) of other PPDUs that might not carry omniEirp(txPpdu,R)), and be reasonably recent (e.g., within 5 sec). The ISTA 20 needs to send some information out, accessible by the OSTA 40, and the RSTA 30 needs to send some information out, again to be accessible by the OSTA 40.

More specifically, the ISTA 20 needs to send out information indicating to which device it is transmitting, and this information is referred to as the compressed receiver identity (cR), shown at reference numeral 90 in FIG. 3. The RSTA 30 sends information out non real-time concerning recent PPDUs it received from the ISTA 20, as shown at reference numeral 92. When the OSTA 40 receives that information transmitted by the RSTA 30, it measures the receive signal strength (RSSI). If not recently measured, the OSTA 40 can fall back to conventional CCA such as the CCA for Very High Throughput (VHT) STAs defined in 802.11. The EIRP and transmitter identity (=R) parameters in omniEirp(txPpdu,R) is snooped information, so it needs to be carried in an unencrypted and robustly modulated field (e.g., Signal (SIG) field) of a PPDU from the RSTA 30. Thus, a compressed omniEirp and a compressed RSTA identity are needed. These may be added as an IEEE 802.11 preamble by a new IEEE 802.11 amendment (e.g., High Efficiency Wireless (HEW)). As used herein, "robustly modulated" refers to modulation such as or similar to Binary Phase Shift Keying (BPSK)/Quadrature Phase Shift Keying (QPSK) modulation with a rate ½ up to ¾ convolution code, beyond which is non-robust.

Both the RSSI and receiver identity (=R) parameters in rssi(desiredPpdu,I⇒R) need to be advertised by the RSTA 30 and reach the OSTA 40. Both the RSSI and receiver identity information are snooped information, which need to be carried in a SIG field. The receiver identity is the same as the transmitter identity above.

The SIG fields transmitted by the RSTA 30 (or any other HEW STA) should contain:

compressed RSTA identity (cR) (5-10 bits); and omniEirp(txPpdu,cR)+rssi(desiredPpdu,worstCase⇒cR) (e.g., 6-7 bits), where "worstCase" refers to the situation where multiple stations are attempting to transmit to the RSTA (e.g., the RSTA is an AP), in which case the RSTA 30 reports the RSSI of its worst-situated ISTA (or some approximation thereof: e.g. 95-percencile worst ISTA, 95-percencile worst ISTA within its coverage area; and within the last 5 sec or 24 hours or 1 week; or some filtered average). In other words, the value for omniEirp is a value for a situation where multiple devices are attempting to transmit to the second device (RSTA) and represents weakest receive signal strength information among the multiple devices attempting to transmit to the second device, or an approximation thereof.

Moreover, implicitly, when the ISTA 20 transmits a PPDU to the RSTA 30, the PPDU needs to include the compressed identity of RSTA (cR), (e.g., 5-10 bits).

Responding Transmission

Figure 4:
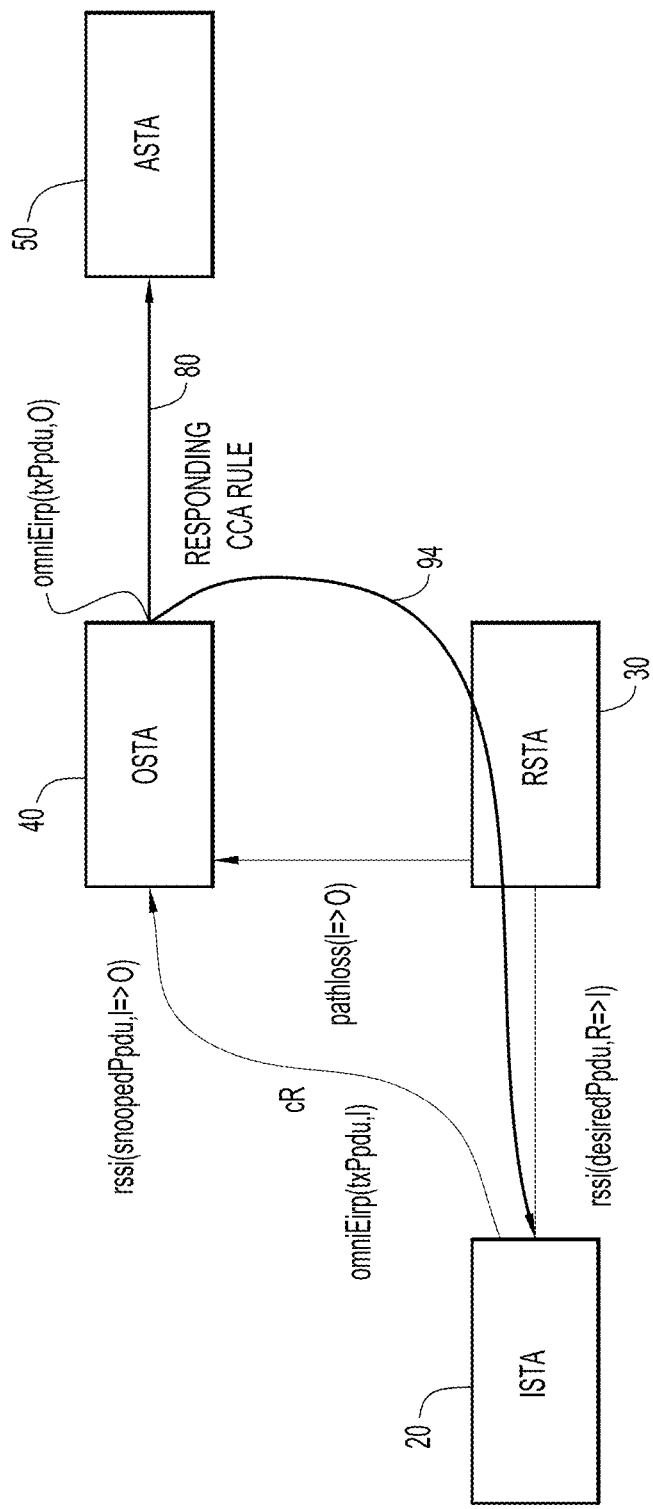
FIGS. 4 and 5 illustrate the wireless network of FIG. 1, in the case of a transmission from a responding device, according to an example embodiment.
Figure 5:
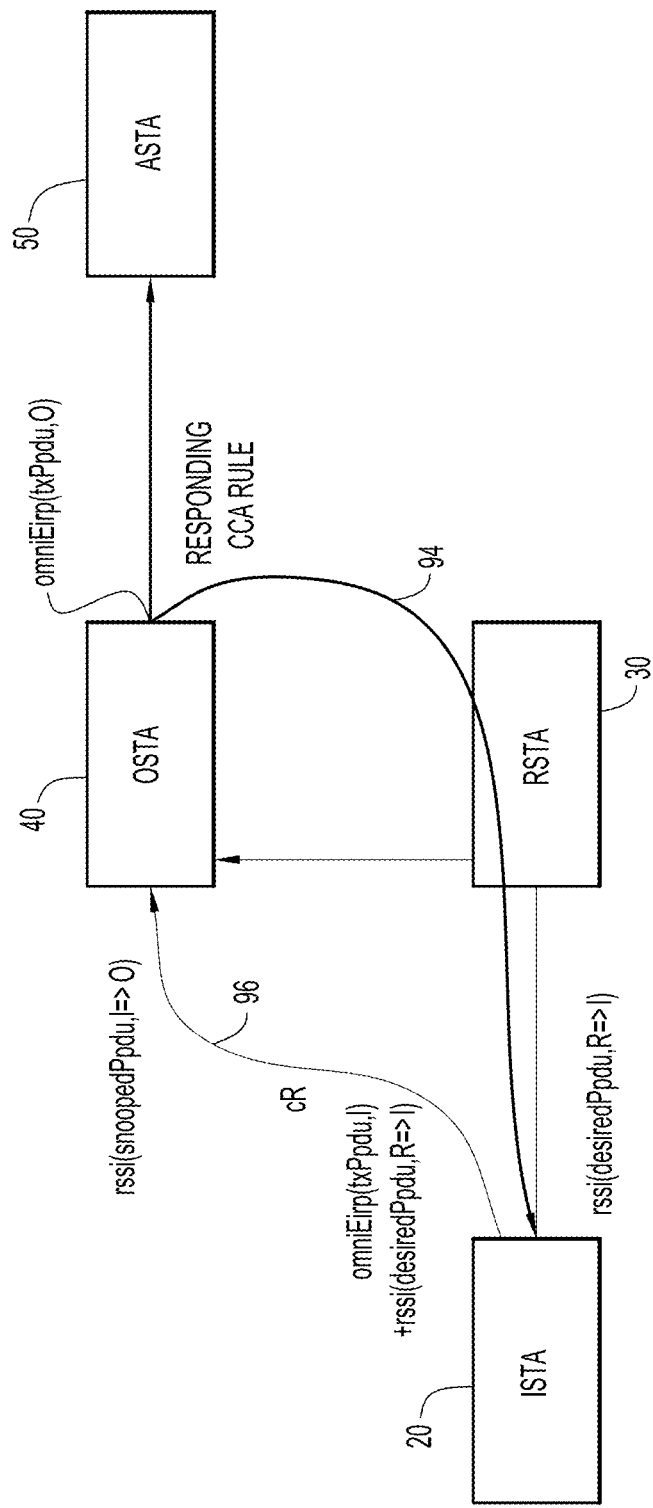

Reference is now made to FIGS. 4 and 5 for the CCA for the responding PPDU. The ISTA 20 can successfully receive PPDUs from the RSTA 30 if either a colliding PPDU from the OSTA 40, shown at reference numeral 94 (associated with the PPDU 80 sent to the ASTA 50) is received at no greater than rssi(desiredPpdu,R⇒I)−Margin, or the OSTA 40 does not transmit. This involves a Responding CCA rule:

$$\text{rssi}(desiredPpdu,R \Rightarrow I) - \text{Margin} > \text{omniEirp}(txPpdu, O) - \text{pathloss}(I \Rightarrow O)$$

where:

$$\text{pathloss}(I \Rightarrow O) = \text{omniEirp}(txPpdu,I) - \text{rssi}(snoopedPpdu,I \Rightarrow O)$$

$$So: \text{rssi}(desiredPpdu,R \Rightarrow I) - \text{Margin} > \text{omniEirp}(txPpdu,O) - \text{omniEirp}(txPpdu,I) + \text{rssi}(snoopedPpdu,I \Rightarrow O)$$

$$Or: \text{omniEirp}(txPpdu,O) < \text{omniEirp}(txPpdu,I) + \text{rssi}(desiredPpdu,R \Rightarrow I) - \text{rssi}(snoopedPpdu,I \Rightarrow O) - \text{Margin} \qquad \text{Equation 2}$$

As shown in FIG. 5, for the OSTA 40 to implement the Responding CCA rule, it needs omniEirp(txPpdu,O), which is already known to the OSTA 40, and rssi(snoopedPpdu, I⇒O), which can be directly measured by the OSTA 40 from the initiating PPDU 70 (FIG. 2). The omniEirp(txPpdu, I) needs to come from the same PPDU and be signalled by the ISTA 20 (or the signaling of the omniEirp(txPpdu,I) parameter in one PPDU needs to indicate that the parameter also characterizes the omniEirp(txPpdu,I) of other PPDUs that might not carry omniEirp(txPpdu,I)). Also, the rssi (desiredPpdu,R⇒I) needs to be advertised by the ISTA 20 as shown at reference numeral 96.

Initiating CCA and Responding CCA Rules

Collecting the requirements described above, the SIG field transmitted by the RSTA 30 (or any other HEW STA) should contain:

RSTA indication (1 bit)

Compressed RSTA identity (cR) (5-10 bits)

omniEirp(txPpdu,R)+rssi(desiredPpdu,R) (6-7 bits)

The SIG field transmitted by the ISTA 20 should contain

ISTA indication (1 bit)

Compressed RSTA identity (cR) (5-10 bits)

omniEirp(txPpdu,I)+rssi(desiredPpdu, I) (6-7 bits)

Other fields may also be included, such as a compressed indication of the RSTA 30 identity, so that omniEirp(txPpdu, X)+rssi(desiredPpdu, X), X=I or R, is available to snoopers whether the transmitter is currently an ISTA or an RSTA (i.e. snooping collects 2× the information in the same time). Since the responding PPDU typically contains a short frame (e.g., Acknowledgment or Block Acknowledgment), there is little penalty—and some advantages—if the responding PPDU is sent using a more robust modulation and coding scheme. Accordingly, the Margin may be relatively high for the Initiating CCA compared to the Margin for the Responding CCA (via standardization, associated AP control, etc.).

As mentioned above, Margin might also be explicitly included in the SIG field, or combined with the omniEirp (txPpdu,X)+rssi(desiredPpdu, X) terms, X=I or R.

Bitwidth Considerations

The SIG field may be used to transmit the information for the Initiating CCA and the Responding CCA because the SIG field is in the preamble of a frame and uses the lowest modulation, making it readily detectable by nearby devices. Nevertheless, these fields consume SIG time, so terseness is vital. As proposed herein, these fields consume 50%-100% of a whole SIG OFDM symbol. For the compressed R, too few bits implies station ambiguity. OSTAs would lump omniEirp(txPpdu,cR)+rssi(desiredPpdu,I$\Rightarrow$ cR) into the same cR bin for different RSTAs. Since rssi(desiredPpdu,I $\Rightarrow$ cR) would typically be 10-20-30 dB different for two random STAs, this degrades the benefit of this enhanced CCA.

As long as an OSTA receives/detects all RSTAs, this is not fatal. For each bin, the maximum received over the past 5 sec is selected, and at worst the system gracefully degrades back to the current fixed CCA currently in use. However, if two RSTAs, one near and one far, map to the same cR, and an OSTA has recent information about just the far RSTA, but the near RSTA transmits, then the OSTA could transmit and collide with a near RSTA. This motivates more bits for identity, to avoid ambiguity.

For example, assume there are 10000 STAs in range across 10 channels. Then 10 bits of compressed identity would be sufficient to (mostly) uniquely identify STAs. A larger cR likely implies more storage at every OSTA: i.e. $2^{\#bits}$*storage for omniEirp(txPpdu,R)+rssi(desiredPpdu, I$\Rightarrow$ R), i.e. up to 7 kbit.

In another embodiment, an AP monitors omniEirp(txPpdu,R)+rssi(desiredPpdu,I$\Rightarrow$ R) and omniEirp(txPpdu,I)+rssi(desiredPpdu,R$\Rightarrow$ I) for all STAs in its Basic Service Set (BSS), plus probing STAs that associate shortly thereafter, determines a collective value of omniEirp(txPpdu,R)+rssi (desiredPpdu,I$\Rightarrow$ R) for the BSS, publishes it to all associated STAs, which in turn echo this in their SIG field, with a compressed indication of the BSS identity in place of a compressed indication of the RSTA's identity. In this embodiment, storage is proportional to the number of overlapping BSSs, which is rarely more than 128.

Given that many physical APs support different BSSs/BSSIDs, still further storage reduction is possible if the physical AP monitors omniEirp(txPpdu,R)+rssi(desiredPpdu,I$\Rightarrow$ R) and omniEirp(txPpdu,I)+rssi(desiredPpdu,R$\Rightarrow$ I) for all STAs in any of its BSSs. Additionally, probing STAs that associate shortly thereafter determine a collective value of omniEirp(txPpdu,R)+rssi(desiredPpdu,I$\Rightarrow$ R) for all of its BSSs, publishes it to all STAs associated with any of its BSSs, which in turn echo this in their SIG field, with a compressed indication of the multiple-BSSID identity in place of a compressed indication of the RSTA's identity. In this embodiment, storage is proportional to the number of overlapping physical APs, which is rarely more than 32.

Further Considerations

Values for omniEirp and RSSI may not be known. It would not be unusual for devices to have a +−5 dB measurement tolerance. Especially for non-isotopic antennas (including omnidirectional antennas), omniEirp may be set to conducted power plus some antenna efficiency.

Reusing 5 second old measurements may be acceptable, depending on device speed. This period of time could be longer if measurements are sparse. As well, some level of weighting/prediction can be incorporated: e.g., if RSSIs are increasing, a higher value is used, if RSSIs are decreasing, then the most recent measurement value is used.

Margin is a critical parameter to select. Optimal modulation to maximize system throughput is closer to Quadrature Phase Shift Keying (QPSK) with higher spatial reuse than 256QAM with lower spatial reuse, i.e., lower margin. The Margin value may be controllable by an access point, and not a fixed value.

If multiple OSTAs transmit at the same time, they raise the interference floor. This can be readily mitigated by adding a few dB extra to Margin.

In general, these CCA rules are more relaxed than the CCA rules defined for VHT STAs in IEEE 802.11, but not always (e.g., protection of long-range links).

Bandwidth can be easily accounted for if the advertised omniEirp and RSSI parameters report energy per unit of bandwidth (e.g. 20 MHz). The system is most robust if the RSTA can be uniquely identified with high probability by its cR field.

Neither legacy PPDUs nor groupcast messages are addressed. In this case, the default is pre-existing CCA rules such as the CCA rules defined for VHT STAs in IEEE 802.11. Probe Requests may use legacy PPDUs. Alternatively, these techniques may be applied to broadcast frames, and an access point would use a different encoding (to identify itself) for broadcast frames. That is, the access point would encode an identity of itself to indicate that the frame is global, and indicating the CCA threshold to be used for the broadcast frame.

With Orthogonal Frequency Division Multiple Access (OFDMA) techniques and multi-user multiple-input multiple-output (MU-MIMO), it is difficult to find sufficient SIG bits to indicate each RSTA. The parameters sent by the ISTA need to be sent in a SIG field (since the ISTA will send at a higher modulation coding scheme/number of spatial streams (MCS/NSS)). Therefore, it may be desirable to default to pre-existing CCA rules in this case, or treat the PDDU as containing a groupcast frame.

By contrast, the parameters sent by the RSTA do not have to be sent in a SIG field. They can be sent in low rate frames, such as Request-to-Send, Clear-to-Send, Acknowledgement, Block Acknowledgment frames.

In the field, an RSTA may be configured to over-report its desired RSSI by a few dB (or more) to give it a higher Signal-to-Interference Plus Noise Ratio (SNR). omniEIRP+RSSI can be compared against measurements made by test equipment using nearby/co-located antennas. Similarly, an access point with desired clients intermittently probing/associating from long range might always report a very high omniEirp(txPpdu,cR)+rssi(desiredPpdu,I$\Rightarrow$ cR). This is not unreasonable behavior. APs in high density environments are highly motivated to report low-and-correct rssi(desiredPpdu,cR) values.

The protection time could and should be different for the ISTA and RSTA. The Initiator CCA rule only applies for 0 to TXTIME(thisPPDU)+smallGuardTime from the beginning of the initiating PPDU, and the responder CCA rule only applies from TXTIME(thisPPDU)+SIFS−smallGuardTime to TXTIME(thisPPDU)+SIFS+max(TXTIME(Ack), TXTIME(BA))+smallGuardTime, where SIFS is the short inter-frame spacing interval. In other words, a first time interval during which the third device (OSTA) determines whether or not to send a transmission that may overlap with the transmission from the first device (ISTA) is different from a second time interval during which the third device (OSTA) determines whether or not to send a transmission that may overlap with the response transmission from the second device (RSTA) to the first device (ISTA).

Moreover, the cR could be deliberately selected so as not to collide with a nearby STA.

Figure 6:
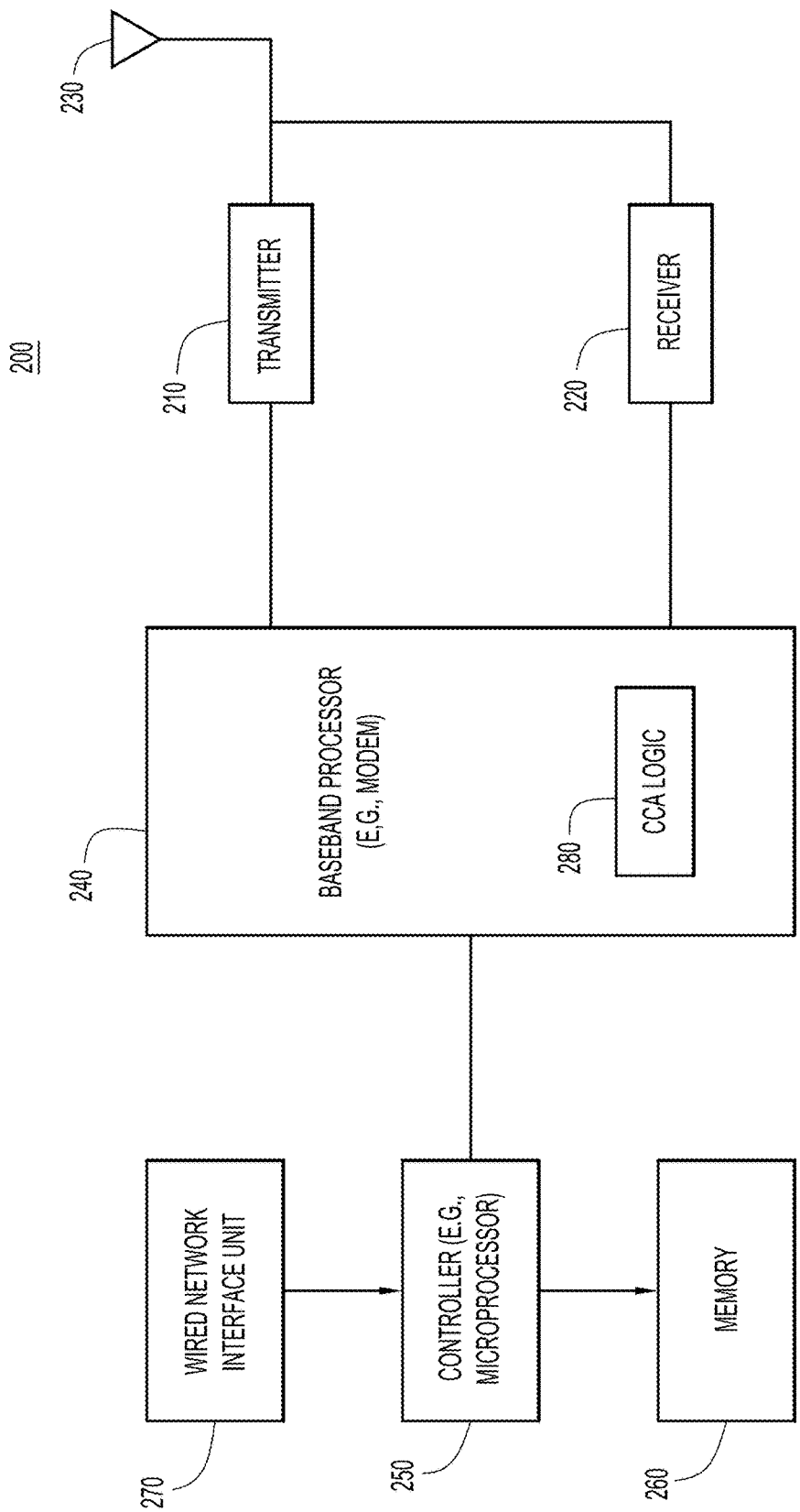
FIG. 6 is a block diagram of a wireless device configured to perform the techniques presented herein, according to an example embodiment.

FIG. 6 illustrates a block diagram of a wireless device 200 (e.g., STA, meaning an access point or a client device) configured to perform the CCA techniques presented herein. The wireless device includes a transmitter 210 (or multiple transmitters), a receiver 220 (or multiple receivers), an antenna 230 (or multiple antennas, each for a corresponding receiver and/or transmitter), a baseband processor (e.g., a modem) 240 and a controller 250. The baseband processor 240 may perform media access control (MAC) functions as well as physical layer (PHY) functions. The controller 250 is connected to a memory 260 and to a wired network interface unit 270 to provide connectivity to a wired network.

The CCA techniques presented herein may be implemented by CCA logic 280 in the baseband processor. The CCA logic 280 may take the form of fixed or programmable digital logic gates. In another form, the CCA logic 280 may be implemented by instructions stored/encoded in the memory 260 and executed by the controller (e.g., a microprocessor) 250. To this end, the memory may comprise read only memory (ROM), random access memory (RAM), magnetic disk storage media devices, optical storage media devices, flash memory devices, electrical, optical, or other physical/tangible memory storage devices. Thus, in general, the memory may comprise one or more tangible (non-transitory) computer readable storage media (e.g., a memory device) encoded with software comprising computer executable instructions and when the software is executed (by the controller) it is operable to perform the operations described herein.

Figure 7:
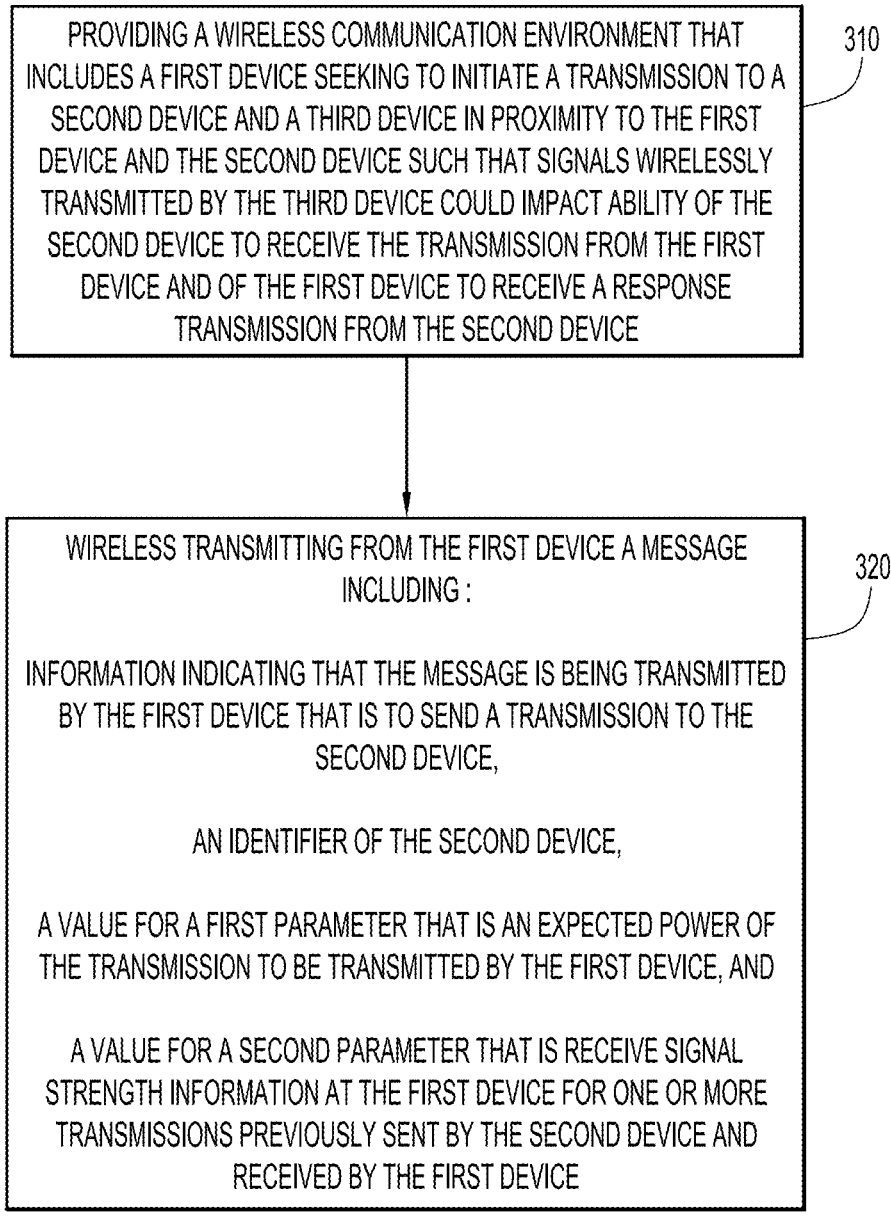
FIG. 7 is a flow chart depicting operations performed by a wireless device sending an initiating transmission, according to an example embodiment.

Reference is now made to FIG. 7. FIG. 7 illustrates a flow chart depicting operations of a method 300 performed by an ISTA in accordance with the embodiments presented herein. At 310, a wireless communication environment is provided that includes a first device seeking to initiate a transmission to a second device and a third device in proximity to the first device and the second device such that signals wirelessly transmitted by the third device could impact ability of the second device to receive the transmission from the first device, and of the first device to receive a response transmission from the second device. At 320, the first device wirelessly transmits a message including: (a) information indicating that the message is being transmitted by the first device that is to send a transmission to the second device; (b) an identifier of the second device; (c) a value for a first parameter [omniEirp(txPpdu,I)] that is an expected power of the transmission to be transmitted by the first device; and (d) a value for a second parameter [rssi(desiredPpdu,I)] that is receive signal strength information at the first device for one or more transmissions previously sent by the second device and received by the first device. Moreover, as explained above, the message may be contained in a field of a preamble of a PPDU formatted in accordance with the IEEE 802.11 standard, or in a field of a MAC header that is unencrypted (and robustly modulated).

Figure 8:
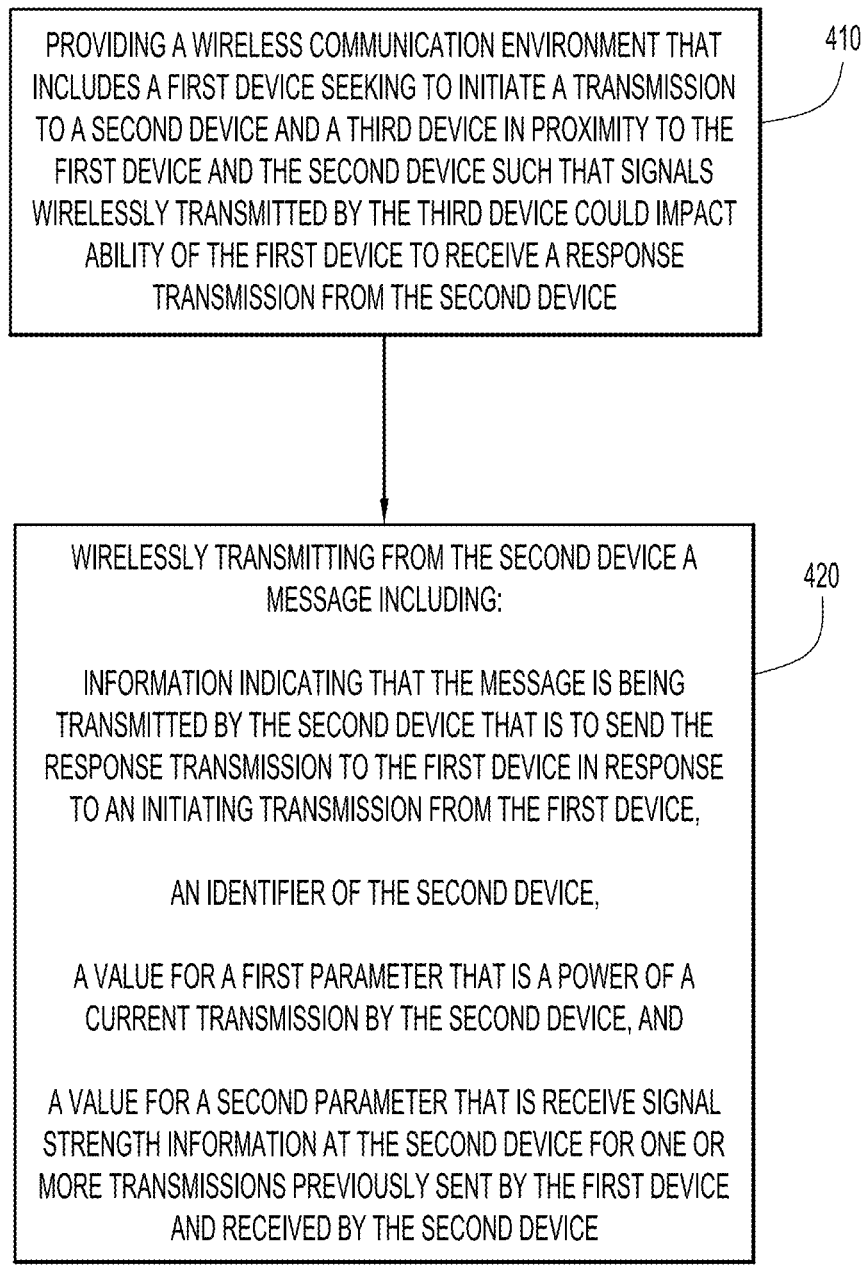
FIG. 8 is a flow chart depicting operations performed by a wireless device making a response transmission, according to an example embodiment.

Similarly, FIG. 8 illustrates a flow chart depicting operations for a method 400 performed by an RSTA in accordance with the embodiments presented herein. At 410, a wireless communication environment is provided that includes a first device seeking to initiate a transmission to a second device and a third device in proximity to the first device and the second device such that signals wirelessly transmitted by the third device could impact ability of the first device to receive a response transmission from the second device. At 420, the second device wireless transmits a message including: (a) information indicating that the message is being transmitted by the second device that is to send the response transmission to the first device in response to an initiating transmission received from the first device; (b) an identifier of the second device, (c) a value for a first parameter [omniEirp(txPpdu,R)] that is a power of a current transmission by the second device; and (d) a value for a second parameter [rssi(desiredPpdu,R)] that is receive signal strength information at the second device for one or more transmissions previously sent by the first device and received by the second device. The message may include information indicating a value for the first parameter for each of one or more other transmissions made by the second device, e.g., of other PPDUs that are covered by the same value for the first parameter. Moreover, as explained above, the message may be contained in a field of a preamble of a PPDU formatted in accordance with the IEEE 802.11 standard, or in a field of a MAC header that is unencrypted (and robustly modulated).

Figure 9:
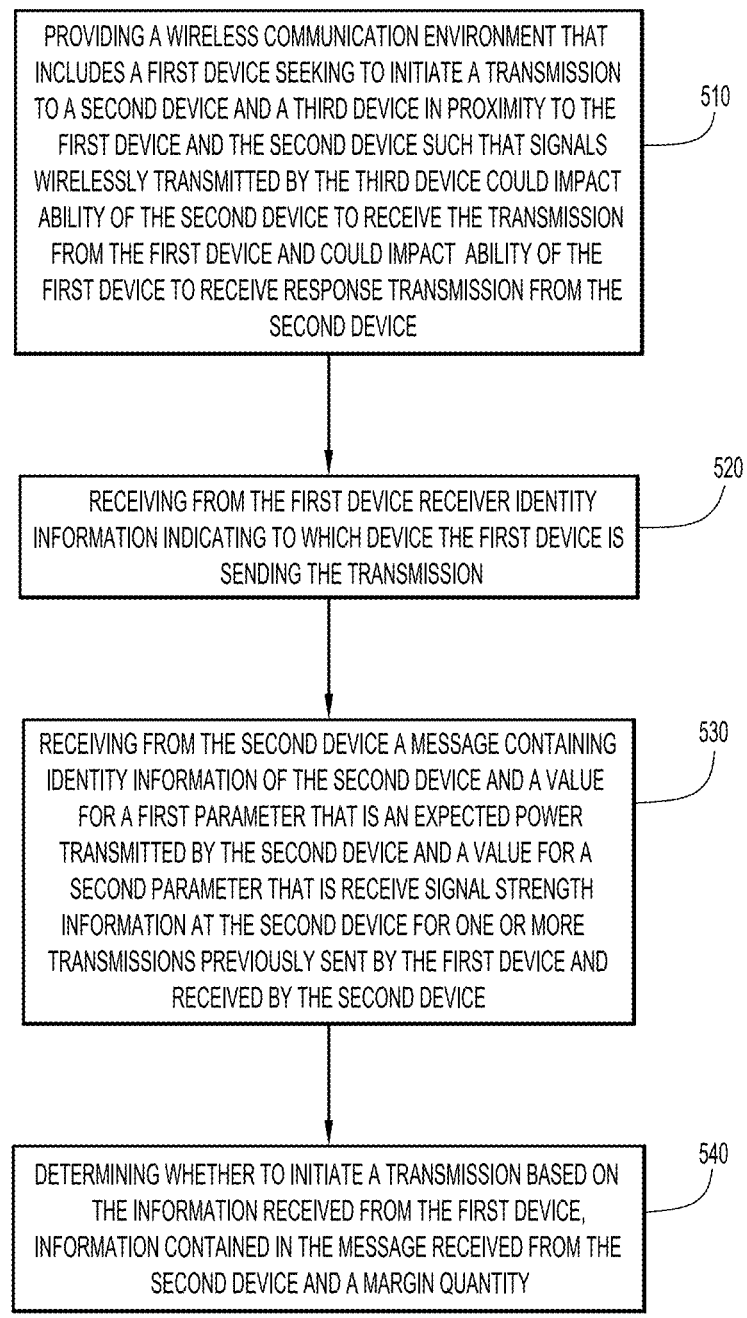
FIG. 9 is a flow chart depicting operations performed by a wireless device in implementing the initiating CCA rule and responding CCA rule presented herein, according to an example embodiment.

Turning now to FIG. 9, a flow chart is shown for a method 500 performed by an OSTA according to the embodiments presented herein. At 510, a wireless communication environment is provided that a first device seeking to initiate a transmission to a second device and a third device in proximity to the first device and the second device such that signals wirelessly transmitted by the third device could impact ability of the second device to receive the transmission from the first device. At 520, the third device receives from the first device receiver identity information indicating to which device the first device is sending the transmission. At 530, the third device receives from the second device a message containing identity information of the second device, a value for a first parameter that is an expected power transmitted by the second device [e.g., the aforementioned omniEirp(txPpdu,R)] and a value for a second parameter that is receive signal strength information at the second device for one or more transmissions previously sent by the first device and received by the second device [e.g., the aforementioned rssi(desiredPpdu,I$\Rightarrow$R)]. The message may be contained in a field of a preamble of a PPDU formatted in accordance with the IEEE 802.11 standard, or contained in a MAC header that is unencrypted (though robustly modulated). At 540, the third device determines whether to initiate a transmission based on the information received from the first device, information contained in the message received from the second device and a margin quantity.

The determining operation 540 may be based further on a value of a third parameters that is an expected power for the transmission to be sent by the third device [e.g., the aforementioned omniEirp(txPpdu,O)] and a value of a fourth parameter that is receive signal strength information for a transmission sent by the second device and received at the third device [e.g., the aforementioned rssi(snoopedPpdu,R$\Rightarrow$O)].

Moreover, the determining operation 540 may further involve determining whether a sum of the value for the first parameter and the value for the second parameter minus the value for the fourth parameter and the margin quantity is greater than the value for the third parameter [omniEirp(txPpdu,O)<omniEirp(txPpdu,R)+rssi(desiredPpdu,I$\Rightarrow$R)−rssi(snoopedPpdu,R$\Rightarrow$O)−Margin] Furthermore, instead of performing this in the dB domain with addition and subtraction operations, this may be performed with multiplication and division operations in the linear power or magnitude domain. The transmission from the first device is initiated if the sum of the value for the first parameter and the value for the second parameter minus the value for the fourth parameter and the margin quantity is greater than the value for the third parameter and otherwise not the transmission from the third device is not initiated. As explained above, the margin quantity may be a predetermined value or may be contained in the message received from the second device.

To summarize, a pair of CCA rules are presented herein that protect an initiator's PPDU at the responder, and the responder's PPDU at the initiator, using additional fields transmitted in a preamble (header) of a PPDU or in a MAC header, if unencrypted. These techniques enable more parallel/simultaneous transmissions between devices that would otherwise interfere with each other, subject to ensuring an adequate SINR (15-30 dB) for the initiator's PPDU at the responder and ensuring an adequate SNR (15-30 dB) for the responder's PPDU at the initiator.

In addition to the various methods described above (such as in connection with the flowcharts of FIGS. 7-9), the techniques may be embodied in an apparatus and/or non-transitory computer readable storage media form. For example, an apparatus may be provided that comprises a wireless network interface unit and a processor. The wireless network interface unit is configured to transmit wireless signals and receive wireless signals in wireless communication environment that includes a first device seeking to initiate a transmission to a second device and the first device to receive a response transmission from the second device, and further to: receive from the first device a signal containing receiver identity information indicating to which device the first device is sending the transmission; and receive from the second device a signal containing identity information of the second device and a value for a first parameter that is an expected power transmitted by the second device and a value for a second parameter that is receive signal strength information at the second device for one or more transmissions previously sent by the first device and received by the second device. The processor is coupled to the wireless network interface unit and is configured to determine whether to initiate a transmission based on information contained in the signal received from the first device, information contained in the signal received from the second device and a margin quantity.

The above description is intended by way of example only.

What is claimed is:

1. A method comprising:
at a third device in a wireless communication environment in which the third device is in proximity to a first device and a second device causing signals wirelessly transmitted by the third device to impact an ability of the second device to receive a transmission from the first device;
receiving from the first device receiver identity information indicating that the first device is sending the transmission to the second device;
receiving a message transmitted by the second device, the message containing identity information of the second device and a value for a first parameter that is an expected power of the message transmitted by the second device and a value for a second parameter that is receive signal strength information at the second device for one or more transmissions previously sent by the first device and received by the second device;
based on an expected power of a transmission of a wireless signal from the third device, determining an expected interference to the transmission to the second device caused by the transmission of the wireless signal from the third device; and
determining whether to initiate the transmission of the wireless signal from the third device based on an expected value of receive signal strength information of the transmission to the second device, the expected interference to the transmission to the second device, and a margin quantity, wherein the expected value of the receive signal strength information of the transmission to the second device is determined from the receive signal strength information at the second device for one or more transmissions previously sent by the first device and received by the second device.

2. The method of claim 1, wherein the expected interference to the transmission to the second device is determined by subtracting a path loss between the third device and the second device from the expected power of the transmission of the wireless signal from the third device.

3. The method of claim 2, wherein the path loss between the third device and the second device is determined as a difference between the expected power of the message transmitted by the second device and received by the third device and the receive signal strength information of the message transmitted by the second device, wherein the receive signal strength information of the message transmitted by the second device is measured at the third device.

4. The method of claim 1, further comprising initiating the transmission of the wireless signal from the third device when the difference between the expected receive signal strength information of the transmission to the second device and the expected interference to the transmission to the second device is greater than the margin quantity, otherwise, not initiating the transmission from the third device.

5. The method of claim 1, wherein the margin quantity is a predetermined value.

6. The method of claim 1, wherein the margin quantity is contained in the message received from the second device.

7. The method of claim 1, wherein the value for the receive signal strength information at the second device for one or more transmissions previously sent by the first device and received by the second device is a value for a situation where multiple devices are attempting to transmit to the second device and represents weakest receive signal strength information among the multiple devices attempting to transmit to the second device, or an approximation thereof.

8. The method of claim 1, wherein the message is contained in a field of a preamble of a Physical Layer Convergence Procedure (PLCP) Protocol Data Unit (PPDU).

9. The method of claim 1, wherein the third device receives the message contained in a Media Access Control (MAC) header that is unencrypted.

10. A method comprising:
at a first device in a wireless communication environment in which the first device is seeking to initiate a wireless transmission of a message to a second device and a third device in proximity to the first device and the second device causing signals wirelessly transmitted by the third device to impact an ability of the first device to receive a response transmission from the second device;
wirelessly transmitting the message to the second device, wherein the message includes information indicating that the second device is to send the response transmission to the first device in response to the message received from the first device, an identifier of the first device, a value for a first parameter that is a power of the wireless transmission of the message transmitted by the first device and a value for a second parameter that is a desired receive signal strength information at the first device for the response transmission, wherein the information included in the message enables the third device to determine whether to initiate a transmission of a wireless signal based on an expected interference to the response transmission caused by the transmission of the wireless signal and a margin quantity, wherein the expected interference to the response transmission is determined by subtracting a path loss between the third device and the first device from an expected power of the transmission of the wireless signal by the third device.

11. The method of claim 10, wherein the third device determines to initiate the transmission of the wireless signal when the difference between the desired receive signal strength information of the response transmission and the expected interference to the response transmission is greater than the margin quantity.

12. The method of claim 10, wherein the identifier of the first device is a compressed value indicating an identifier of the second device.

13. The method of claim 10, wherein the message is contained in a field of a preamble of a Physical Layer Convergence Procedure (PLCP) Protocol Data Unit (PPDU).

14. The method of claim 10, wherein the message is contained in a field of Media Access Control (MAC) header that is unencrypted.

15. A method comprising:
at a third device in a wireless communication environment that includes a first device seeking to initiate a transmission to a second device and a third device in proximity to the first device and the second device causing signals wirelessly transmitted by the third device to impact an ability of the second device to receive the transmission from the first device and of the first device to receive a response transmission from the second device;
receiving a message wirelessly transmitted from the first device, wherein the message includes information indicating that the message is being transmitted by the first device that is to send a transmission to the second device, an identifier of the second device, a value for a first parameter that is an expected power of the transmission to be transmitted by the first device and a value for a second parameter that is receive signal strength information at the first device for one or more transmissions previously sent by the second device and received by the first device; and
determining whether to initiate a transmission of a wireless signal from the third device based on an expected power of the transmission to be transmitted by the first device, the receive signal strength information at the first device for one or more transmissions previously sent by the second device and received by the first device, and a margin quantity.

16. The method of claim 15, wherein the identifier of the second device is a compressed value indicating an identifier of the second device.

17. The method of claim 15, wherein the message is contained in a field of a preamble of a frame formatted in accordance with the IEEE 802.11 standard.

18. The method of claim 15, wherein the message is contained in a field of Media Access Control (MAC) header that is unencrypted.

19. The method of claim 15, wherein a first time interval during which the third device determines whether to initiate the transmission of a wireless signal that may overlap with the transmission from the first device is different from a second time interval during which the third device determines whether to initiate the transmission that may overlap with the response transmission from the second device to the first device.

20. An apparatus comprising:
a transmitter configured to transmit wireless signals and a receiver configured to receive wireless signals in a wireless communication environment that includes a first device seeking to initiate a transmission to a second device and the first device to receive a response transmission from the second device, the receiver is further configured to:
receive from the first device a signal containing receiver identity information indicating to which device the first device is sending the transmission; and
receive from the second device a signal containing identity information of the second device and a value for a first parameter that is an expected power of the signal transmitted by the second device and a value for a second parameter that is receive signal strength information at the second device for one or more transmissions previously sent by the first device and received by the second device;
a controller coupled to the transmitter and the receiver, wherein the controller is configured to:
determine a path loss between the transmitter and the second device;
determine an expected interference to the transmission to the second device caused by a transmission of a wireless signal from the transmitter, wherein the expected interference is determined by subtracting the path loss between the transmitter and the second device from an expected power of the transmission of the wireless signal; and
determine whether to initiate the transmission of the wireless signal based on an expected value of receive signal strength information of the transmission to the second device, the expected interference to the transmission to the second device, and a margin quantity, wherein the expected value of the receive signal strength information of the transmission to the second device is determined from the receive signal strength information at the second device for one or more transmissions previously sent by the first device and received by the second device.

21. The apparatus of claim 20, wherein the controller is further configured to initiate the transmission of the wireless signal if the difference between the expected value of the receive signal strength information of the transmission to the second device and the expected interference to the transmission to the second device is greater than the margin quantity, otherwise, not initiating the transmission.

22. The apparatus of claim 21, wherein the margin quantity is a predetermined value.

23. The apparatus of claim 21, wherein the margin quantity is contained in the signal received from the second device.

\* \* \* \* \*